No. 812,683. PATENTED FEB. 13, 1906.
R. SCHENCK.
VALVE FOR GAS GENERATORS.
APPLICATION FILED FEB. 23, 1904.
4 SHEETS—SHEET 1.
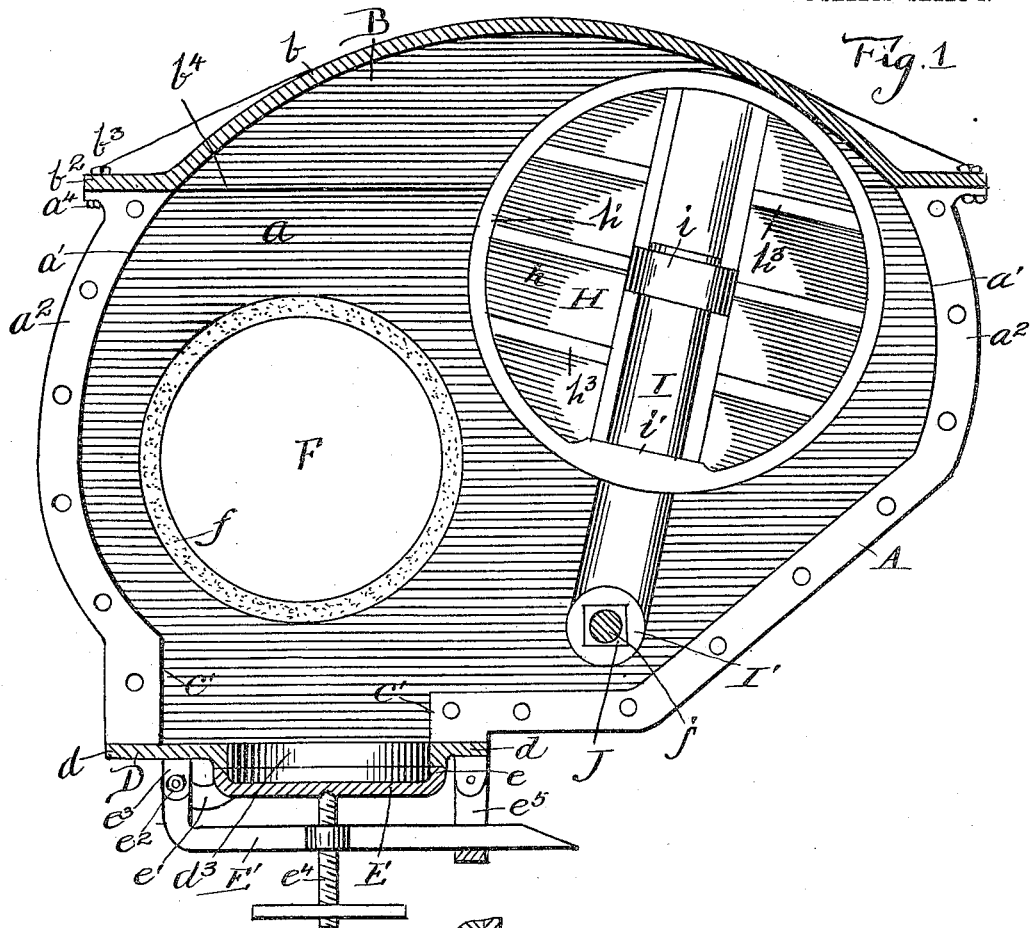
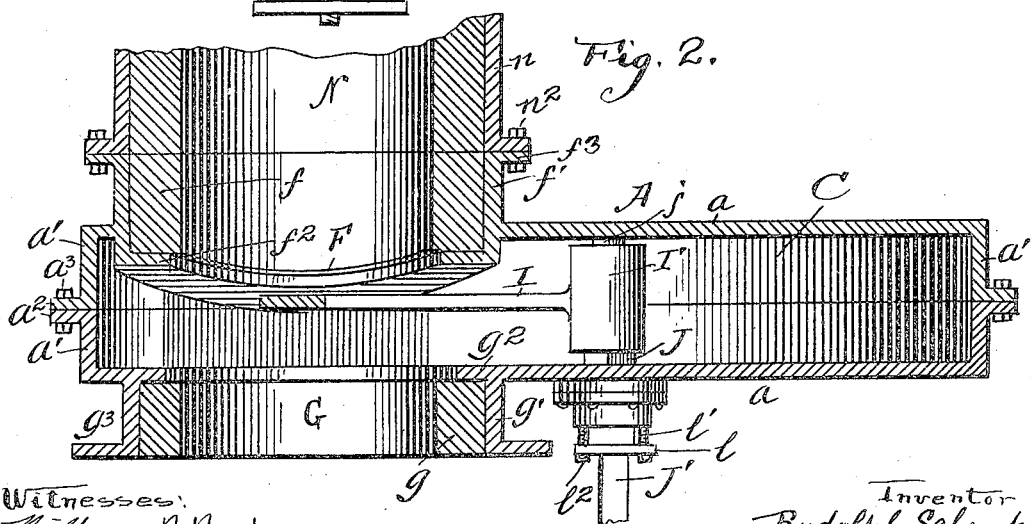
Witnesses:
William P. Bond
Pierson W. Banning
Inventor
Rudolph Schenck
By Banning & Banning
Attys.

No. 812,683. PATENTED FEB. 13, 1906.
R. SCHENCK.
VALVE FOR GAS GENERATORS.
APPLICATION FILED FEB. 23, 1904.
4 SHEETS—SHEET 2.
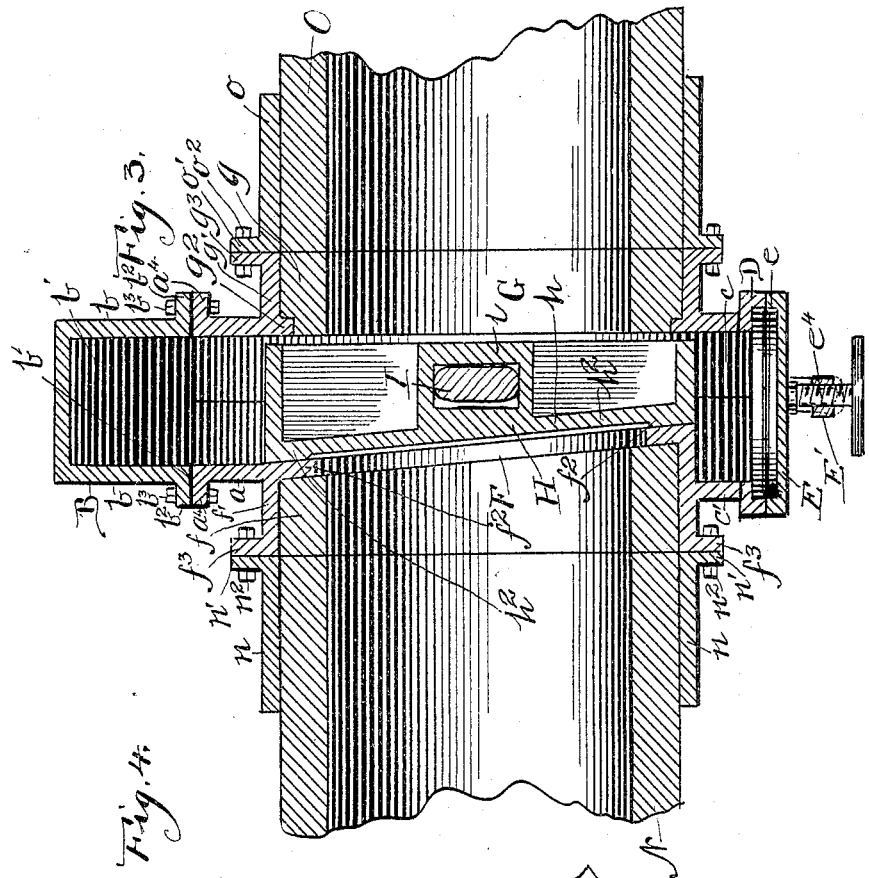
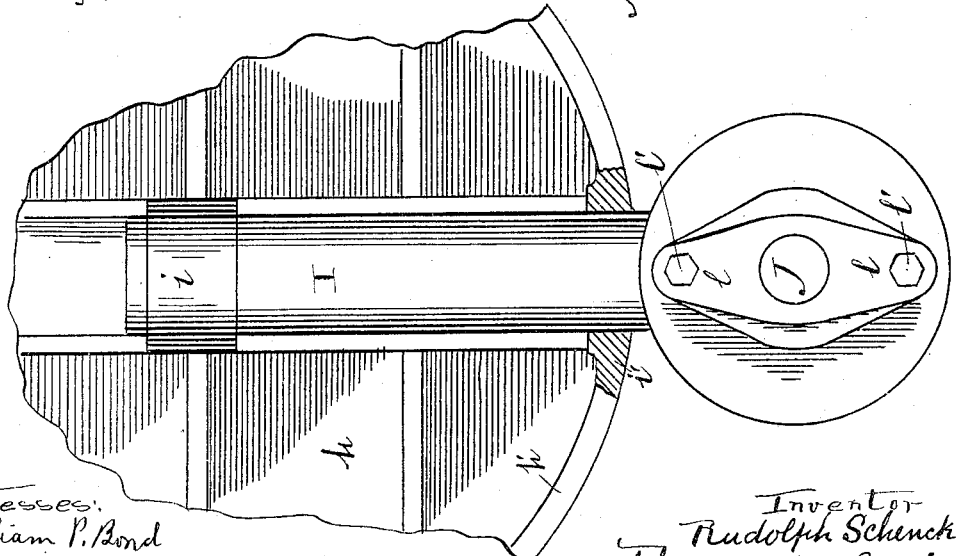
Witnesses:
William P. Bond
Pierson W. Banning
Inventor
Rudolph Schenck
By Banning & Banning
Attys.

No. 812,683. PATENTED FEB. 13, 1906.
R. SCHENCK.
VALVE FOR GAS GENERATORS.
APPLICATION FILED FEB. 23, 1904.
4 SHEETS—SHEET 3.
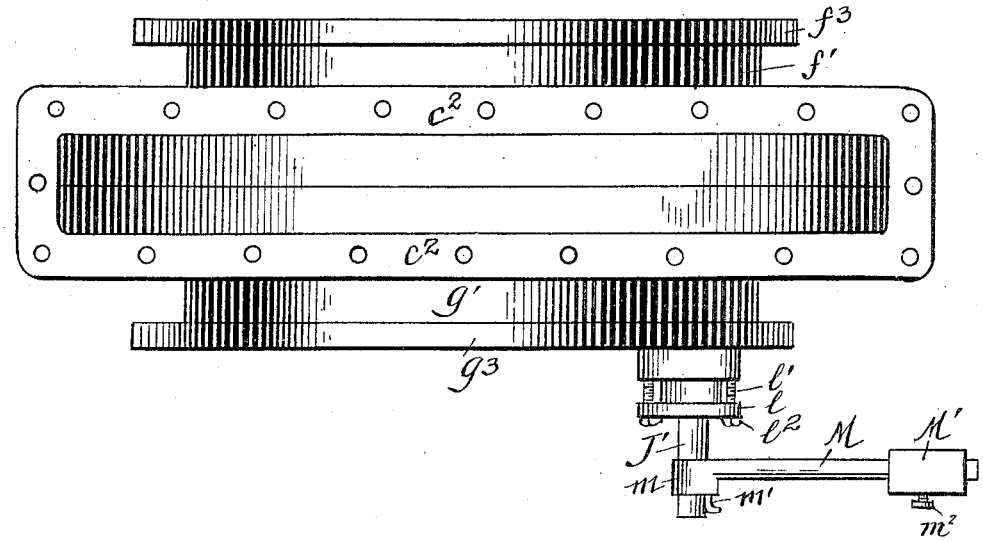
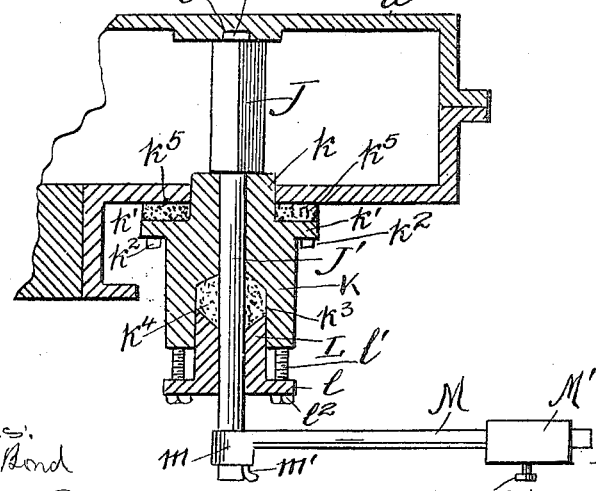
Witnesses:
William P. Bond
Pierson W. Banning
Inventor
Rudolph Schenck
By Banning & Banning
Attys.

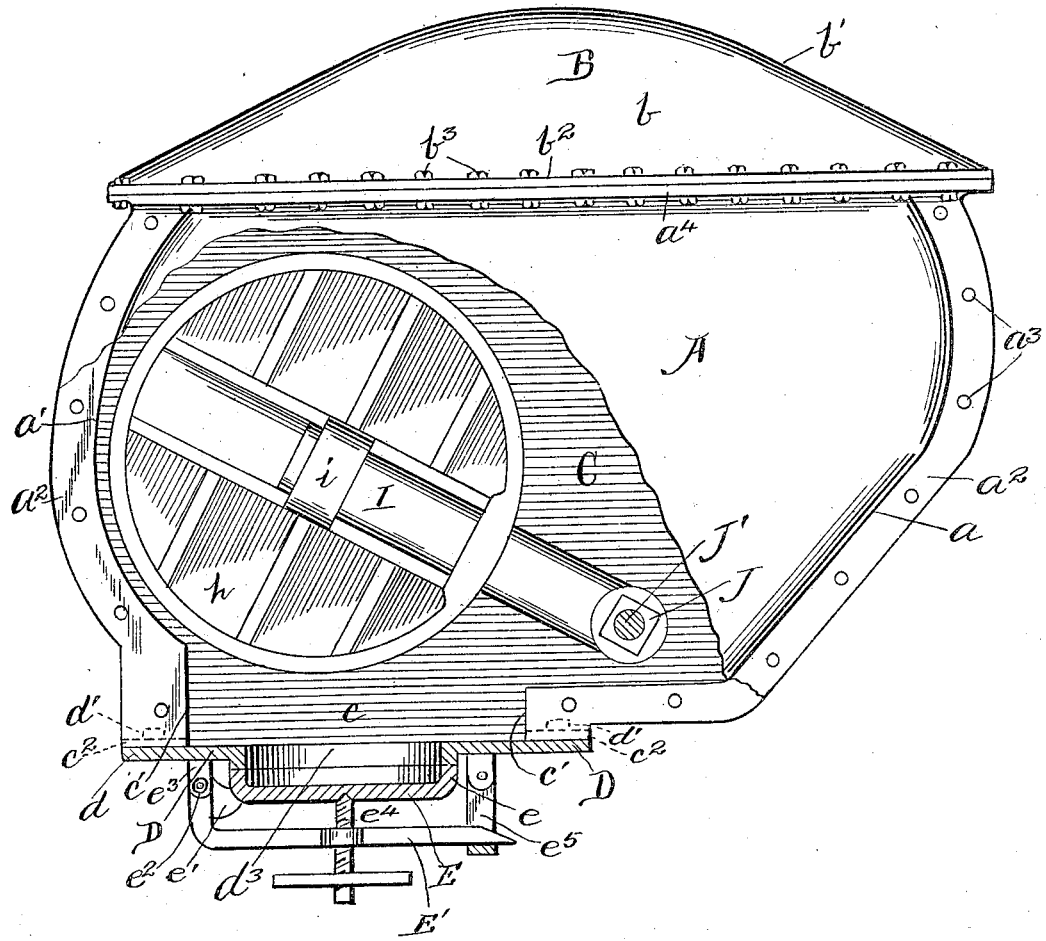

UNITED STATES PATENT OFFICE.

RUDOLPH SCHENCK, OF CHICAGO, ILLINOIS, ASSIGNOR TO JOHN WILLIAMSON, OF CHICAGO, ILLINOIS.

VALVE FOR GAS-GENERATORS.

No. 812,683.          Specification of Letters Patent.          Patented Feb. 13, 1906.

Application filed February 23, 1904. Serial No. 194,915.

*To all whom it may concern:*

Be it known that I, RUDOLPH SCHENCK, a citizen of the United States, residing at Chicago, in the county of Cook and State of Illinois, have invented certain new and useful Improvements in Valves for Gas-Generators, of which the following is a specification.

The valve of the present invention is primarily designed for use in gas apparatus for the manufacture of what is known or termed "water-gas," but can be used in other apparatus for making gas and for other purposes.

The valve is designed and intended more particularly for use in the outlet between the furnace and the carbureter and superheater, for which purpose the valve must fit closely and must not be too sensitive to excessive heat, must have its seat protected against the effects of heat, and must be easily manipulated in forcing it to its seat and raising it from its seat.

The objects of the invention are to improve the construction of the valve and the chamber in which it is located and operates, to protect the seat against direct contact with escaping heat, to enable the valve to be readily and quickly handled in moving it to its closed position and to its open position, to insure a close seating and fitting of the valve when in its closed position by giving the valve a wedging action in closing, to suspend the valve-disk so that it hangs loose and is free to assume the proper seating position when closed and at the same time be so held as to be swung into its closed position or its open position, and to improve generally the construction and operation of the parts which enter into the location and arrangement of the valve as a whole.

The invention consists in the features of construction and combinations of parts hereinafter described and claimed.

In the drawings, Figure 1 is an elevation, partly in section, showing the valve in its open position; Fig. 2, a horizontal cross-section on line 2 of Fig. 1, showing the valve-disk removed; Fig. 3, a horizontal cross-section on line 3 of Fig. 1; Fig. 4, a detail, being an elevation, partly in section, showing the carrying and suspending arm for the valve-disk and the shaft and stuffing-box for the shaft on which the arm is mounted; Fig. 5, a top or plan view of the valve as a whole; Fig. 6, a detail in section showing the shaft and its mounting for carrying the arm of the valve-disk; and Fig. 7, a side elevation of the valve as a whole, showing the casing partly broken away.

The valve is constructed of a shell or casing A, which is preferably made in two halves or sections, each half section having side walls $a$ and a peripheral wall $a'$, and the abutting or inner edge of each peripheral wall has an outwardly-extending flange $a^2$ for the passage of bolts $a^3$, by means of which the two halves or sections are united one to the other. The shell or casing A is open on its upper side and each half or section is provided at its upper end or top with a flange $a^4$ in the construction shown. The open top of the shell or casing A is closed by a cap or cover B, which, as shown, is made of a single piece having side walls $b$, which line with the side walls $a$ of the shell or casing when the cap or cover is in place, and having a peripheral wall $b'$ forming when the cap or cover is in place a continuation of the peripheral wall $a'$ of the shell or casing; but the cap or cover B could be made in halves or sections corresponding to the shell or casing A, if so desired. The cover B at its bottom or lower end has a flange $b^2$, coinciding with the flange $a^4$, through which flanges bolts $b^3$ for uniting the cover to the shell or casing pass, and, as shown, between the abutting flanges $b^2$ and $a^4$ of the shell or casing and the cover is a packing $b^4$, of asbestos or other suitable material, to insure a tight joint between the shell or casing and the cap or cover.

The shell or casing A and the cap or cover B inclose a chamber C, and leading from the chamber on the lower side or under side of the shell or casing is an opening $c$ between walls $c'$, depending from the body of the shell or casing, which opening is closed by a cover or plate D, having a bearing rim or face $d$ to fit snugly against the end face of the walls $c'$ of the opening, so as to make a close and tight joint. The cover D is attached in place by bolts $d'$, passing through ears $c^2$, extending out from the neck-wall of the opening $c$, and ears $d^2$, extending out from the cover, as shown in Fig. 1. The cover D has therein an opening or hole $d^3$ to enable access to be had to the interior of the chamber C for removing fine ashes and other material from the chamber C without taking off the cover. The opening or hole $d^3$ is tightly closed by a cap E, having a seating-face $e$ and provided on one side with an ear or ears $e'$, through which ear or ears passes a rod $e^2$, mounted in standards or supports $e^3$, extending from the cover D for suspending the cap, so that it can be swung into and out of its closing position. The center of the cap has connected thereto a threaded stem $e^4$, which passes through and operates in a cotter-bar E', which bar E' is mounted on the rod $e^2$, and this bar E' at its free end when the cap is closed passes under a loop $e^5$, pivotally mounted on the cover D, so as to lock and hold the cap in place to tightly close the opening $d^3$ in the cover. The seating-faces of the cover and the cap can have an asbestos or other packing to make a tight joint.

The chamber C has leading thereinto on one side an inlet F, which is inclosed by a lining $f$, of fire-brick or other suitable material capable of withstanding a high heat. The wall $f$ of the inlet F is entered into the opening of an annular rim $f'$, projecting out from one side wall $a$ of the shell or casing, and the inner end of the wall $f$ abuts against a flange $f^2$, the inner face of which is the valve-seat, which is thus brought outside of the line of passage of the flame and heat units through the inlet side of the valve, by which arrangement the valve-seat is protected against the effects of the flame and heat passing through the valve. The outer end of the annular rim or flange $f'$, as shown, has a flange $f^3$, by means of which the shell or casing can be attached to the outlet of the furnace. The chamber C has leading out therefrom on the opposite side to the inlet F an outlet G, which is inclosed by a lining or wall $g$, of fire-brick or other material that will withstand a high degree of heat. The lining or wall $g$ is incased within an annular rim or wall $g'$, and, as shown, the inner end of the lining or wall is shouldered and abuts against a flange $g^2$, and the outer end of the annular rim or wall $g'$ at its outer end has a flange $g^3$, by means of which the shell or casing A can be attached to the outlet-pipe. The flange or valve-seat $f^2$ and the inner end face of the lining or wall are arranged on an incline, as shown in Fig. 3, and the flange $g^2$ and lining or wall $g$ have, as shown, a straight inner face, leaving an opening or space forming the closing chamber for the valve-disk between the flanges $f^2$ and $g^2$, which space or chamber, as shown, is of a wedge shape on one side and is widest at the upper side; but the valve-disk space or chamber could have its straight side on an incline parallel with its inclined side, if so desired.

The communication between the inlet F and outlet G is controlled by a disk valve H, formed to enter the space or chamber between the flange or valve-seat $f^2$ and the flange $g^2$, for which purpose in the form shown the seating side of the disk valve is on an incline coinciding with the incline of the inner face of the flange or valve-seat $f^2$. The disk valve is formed of a solid plate $h$ and a peripheral rim $h'$, which rim for a half-wedge-shape space or chamber can be made widest at the top, as shown in Fig. 3, with the outer face of the rim adjacent to the flange $g^2$ in a straight plane. The acting face of the plate $h$ of the valve-disk H has a ledge or rib $h^2$, the face of which can be ground or otherwise finished so as to fit when the valve-disk is down, as shown in Fig. 3, tightly against the face of the flange or valve-seat $f^2$ and effectually close the passage between the inlet and outlet against the outflow of heat or gas from the furnace, and cross-ribs $h^3$ on the back of the plate $h$ add strength and rigidity and prevent the warping of the plate under heat.

The valve-disk H is suspended and carried by an arm I, the outer end of the arm entering a loop $i$ on the valve-disk and the body of the arm passing beneath a loop $i'$ on the rim $h'$, and this arm I is slightly rounded on each side face, so that the valve-disk can rock flatwise on the arm, and thereby insure the seating of its acting edge or rib $h^2$ facewise properly against the face of the flange or valve-seat $f^2$ when the valve is in its closed position. The inner or free end of the arm I on each edge is curved or rounded outwardly slightly, so as to allow the valve-disk to rock peripherally or edgewise and insure its entering the receiving space or chamber therefore to the extent required to effect the seating of its acting face against the flange or valve-seat $f^2$ when the valve is closed. The opposite end of the arm I has a socket I', which is entered onto a rocking support J, which support, as shown, is four-sided, but could be otherwise formed, so as to fixedly unite the arm with the support. The end of the support J, as shown, has a trunnion or bearing-pin $j$, which enters a bearing $j'$, formed therefor on the inner face of a side wall $a$ of the shell or casing, as shown in Fig. 6.

The support J has extending from its end opposite to the trunnion $j$ a rod or shaft J', which passes through a stuffing-box or hollow plug K, which stuffing-box or plug at its inner end has a bearing-face $k$ passing through and projecting beyond the face of the side wall $a$ of the shell or casing, against which bearing-face $k$ the end face of the socket I' presses and serves to seat the valve-disk when down or closed. The exterior of the stuffing-box or plug has a flange $k'$ for the passage of bolts $k^2$, by means of which the stuffing-box or chambered plug is attached to the shell or casing A, as shown in Figs. 2, 5, and 6, and between the flange $k'$ and the face of the shell or casing is a packing $k^5$, of asbestos or other suitable material, which can be thinner or thicker as may be required to project the bearing end of the stuffing-box the proper distance to insure the seating of the valve-disk. The chamber $k^3$ of the stuffing-box has entered thereinto a suitable packing $k^4$, which is compressed around the shaft or rod J', so as to make a tight joint by a follower or gland L, the body of which enters the chamber $k^3$, as shown in Fig. 6, and this gland or follower L has on opposite sides ears $l$ for the passage of threaded stems $l'$, by means of which and nuts $l^2$ the follower or gland can be advanced to compress the packing $k^4$ around the shaft or rod. The shaft or rod J' projects beyond the end of the stuffing-box and has attached thereto a rod M by means of a socket $m$ on the rod and a spline or key $m'$, which locks the socket to the shaft or rod J', and the rod M has slidably mounted thereon a weight M', which is locked to the rod when properly adjusted on the rod by a set-screw $m^2$ or otherwise. The weight M' is to be adjusted on the rod M in such relation to the arm I and the valve-disk as to furnish a counterbalance for the arm and valve-disk, and thereby facilitate the ease with which the disk can be forced or dropped to its seat or raised and carried into the position shown in dotted lines in Fig. 1, so as to leave a clear passage between the inlet and the outlet. The inlet side of the shell or casing is connected to a pipe N by a collar $n$, having a flange $n'$, through which and the rim or flange $f^3$ bolts $n^2$ pass, as shown in Fig. 3, and the outlet for the chamber of the shell or casing is connected to a pipe O by a collar $o$, having a flange or rim $o'$, through which and the flange or rim $g^3$ bolts $o^2$ pass, as shown in Fig. 3. It will be understood, however, that the valve shell or casing can be connected with an outlet-pipe from a furnace or other apparatus in any suitable manner, so that it is interposed in the pipe in such relation as to enable the valve-disk to close the passage-way between the two sections of the pipe.

The parts are assembled by placing the arm I in the chamber C of the shell or casing, with the cap or cover removed, and then inserting the support J through the opening in the wall of the shell or casing for the support to pass through the socket end I' of the arm and its trunnion or journal-pin to enter the bearing therefor. The chambered plug or stuffing-box K is slipped onto the shaft or rod J' and its end wall $k$ entered into the opening in the wall of the shell or casing for its end face to abut against the end face of the support J and the socket I', and the plug or stuffing-box with the packing $k^5$ is then secured in place by the bolts $k^2$ or otherwise. The arm I is turned into a vertical position, so that the valve-disk H can be slipped thereonto and be suspended and supported thereby. The cap or cover B is then placed in position and secured to the shell or casing by the bolts $b^3$ or otherwise. The packing $k^4$ is placed in the chamber $k^3$ of the stuffing-box and the gland or follower inserted and forced inward to compress the packing around the stem J', and the rod M is attached to the stem or shaft J', and the weight M' is placed on the rod M and locked thereto by the set-screw $m^2$ or otherwise. The shell or casing with the assembled parts is secured in place in the pipe, as shown in Fig. 3 or otherwise, and the weight M' is adjusted to properly counterbalance the valve disk and arm.

The valve in use to open a clear passage in the pipe to which it is attached is swung into the position shown in dotted line by turning the stem and support for the arm I so as to carry the arm upwardly and swing the valve-disk into its raised position and clear of the passage-way through the pipe. The valve is closed by turning the support and stem for the arm I, so as to carry the arm I into the position shown by the full lines in Fig. 1, in which position of the arm I the valve-disk will enter the space or chamber between the flange or valve-seat $f^2$ and the flange or face $g^2$, and by reason of the inclined contact-faces and the pressure of the socket I' against the end of the stuffing-box K the valve-disk will be wedged in place for its seating-face to fit snugly against the face of the flange or valve-seat $f^2$ and make a close and tight joint against the escape of heat and gases. The rounded side faces and the curved edges of the suspending and carrying arm I allow of a sufficient face and peripheral rock of the valve - disk, so as to seat uniformly at all points, and the structure of the valve-disk in connection with its annular rim or wall and its strengthening cross-ribs is one that will withstand a high degree of heat without becoming warped or twisted out of shape, and at the same time the valve-disk is sufficiently light to enable it to be handled readily and quickly and without the exertion of a high degree of power.

The cap E can be readily swung to its open position, and when so swung the opening $d^3$ in the cover D enables access to be had to the interior of the chamber G for scraping and cleaning the valve-disk and by means of a scraper removing the flue ashes and deposits, if any there be, in the chamber C. The mounting of the suspending and carrying arm for the valve-disk is one that allows such arm to be removed readily, it only being necessary to disconnect the chambered plug or stuffing-box, which allows the support J to be withdrawn and the arm with the valve-disk to be removed. The packing between the stuffing-box and the shell or casing furnishes a means for adjusting the projection of the end of the stuffing-box into the chamber of the shell or casing, as required to furnish a counter-bearing for the arm I at its socket end to seat the valve-disk, the extent of projection being charged by using a packing of varying thickness. The cover B can be removed, enabling access to be had to the chamber C for repairs to the valve-disk and arm and for cleaning out the chamber C and for making any desired changes. The valve as a whole is simple in construction, but at the same time is sufficiently strong to serve the purpose for which it is intended. It can be readily applied to a pipe for use, it can be handled rapidly and easily, and it will not become non-operative from heat.

What I regard as new, and desire to secure by Letters Patent, is—

1. In a valve for gas-generators, the combination of a shell or casing having a chamber with an inlet thereinto and having a seating-face for a valve around the inlet, a valve-disk having a face to coact with the seating-face around the inlet, a swinging arm within the chamber of the shell or casing and on which the valve-disk is loosely suspended and carried, and swung on the arc of a circle into its closed and opened positions, and a bearing contacting the fixed end of the arm for furnishing a counter-pressure to the acting face of the valve-disk in seating the disk, substantially as described.

2. In a valve for gas-generators, the combination of a shell or casing having a chamber with an inlet thereinto and having a seating-face for a valve around the inlet, a valve-disk having a face to coact with the seating-face around the inlet, a swinging arm within the chamber of the shell or casing and on which the valve-disk is loosely suspended and carried, and swung on the arc of a circle to its closed and opened positions, a rocking support on which the swinging arm is socketed, and a stuffing-box having a bearing end entering into the shell of the casing and engaging with the socket of the arm for giving a counter-pressure on the valve-disk in seating the disk, substantially as described.

3. In a valve for gas-generators, the combination of a shell or casing having a chamber with an inlet and an outlet and having a valve-seat around the inlet into the chamber, a valve-disk controlling the inlet into the chamber and having a face to contact with the seating-face around the inlet, and having on its rear face in the center a socket and having near its periphery a loop and an arm entered through the loop and into the socket on which the valve-disk is loosely mounted and supported, permitting the valve-disk to be seated when swung on the arc of a circle to its closed position, substantially as described.

RUDOLPH SCHENCK.

Witnesses:
JOHN WILLIAMSON,
F. J. FLEISCHHAUER.